Figure 1:
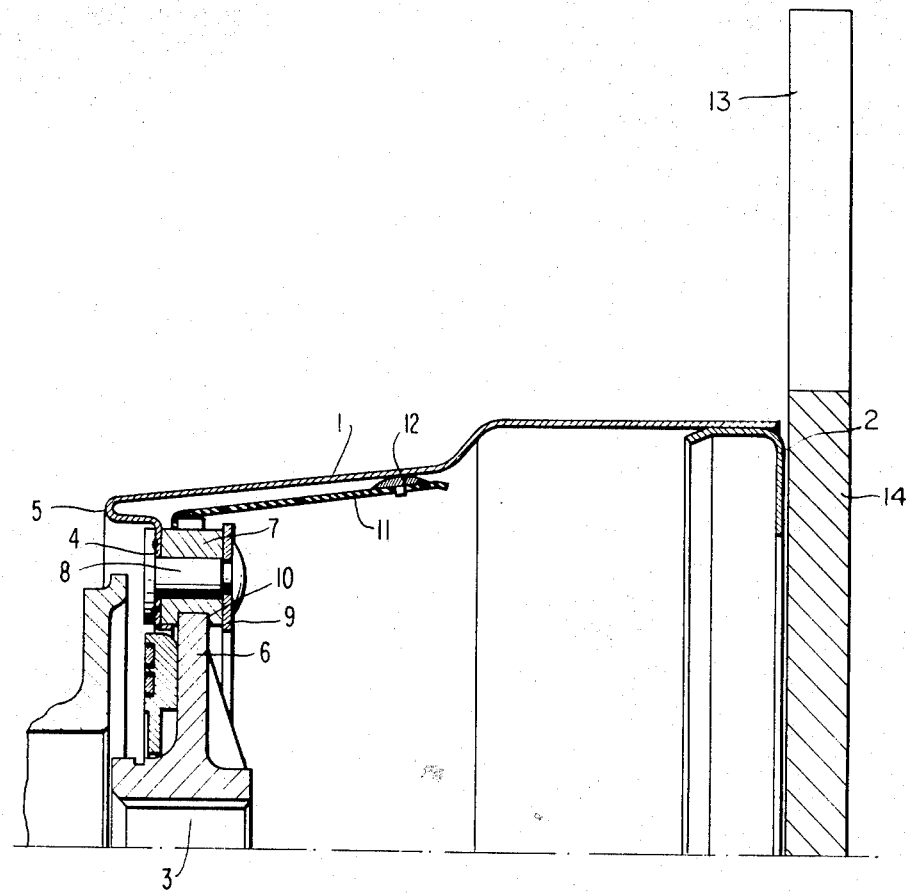

United States Patent
Wilfert et al.

[15] 3,683,717
[45] Aug. 15, 1972

[54] SAFETY STEERING FOR MOTOR VEHICLES, ESPECIALLY FOR PASSENGER MOTOR VEHICLES

[72] Inventors: Karl Wilfert, Gerlingen-Waldstadt; Rudolf Andres, Sindelfingen, both of Germany

[73] Assignee: Daimler-Benz Aktiengesellschaft, Stuttgart-Unterturkheim, Germany

[22] Filed: Nov. 24, 1970

[21] Appl. No.: 92,340

[30] Foreign Application Priority Data

Nov. 27, 1969 Germany..........P 19 59 497.9

[52] U.S. Cl....................................................74/552
[51] Int. Cl. ...............................................B62d 1/04
[58] Field of Search..........74/552, 490, 492; 64/11 R

[56] References Cited

UNITED STATES PATENTS

| | | | |
|---|---|---|---|
| 2,017,681 | 10/1935 | Burgess | 74/552 |
| 2,564,905 | 8/1951 | Kaye | 74/490 |
| 3,561,286 | 2/1971 | Edge et al. | 74/552 |
| 3,567,246 | 3/1971 | Wilfert et al. | 74/492 X |

*Primary Examiner*—William F. O'Dea
*Assistant Examiner*—F. D. Shoemaker
*Attorney*—Craig, Antonelli and Hill

[57] ABSTRACT

A safety steering for motor vehicles, especially for passenger motor vehicles with an impact pot mounted between the steering wheel and the steering column, whereby the impact pot is connected with the steering column by way of an elastic element which is either of unitary or of multi-partite construction.

27 Claims, 2 Drawing Figures

PATENTED AUG 15 1972 3,683,717

INVENTORS
KARL WILFERT
RUDOLF ANDRES

BY Craig, Antonelli,
Stewart & Hill
ATTORNEYS

SAFETY STEERING FOR MOTOR VEHICLES, ESPECIALLY FOR PASSENGER MOTOR VEHICLES

The present invention relates to a safety steering arrangement for motor vehicles, especially for passenger motor vehicles with an impact pot mounted between the steering wheel and the steering column.

The injury danger to the driver in case of an impact on the steering wheel is considerably reduced during a collision by the deformation possibilities of the impact pot. The connection between the steering column and the impact pot, however, involves difficulties since compromises have to be always accepted in order to assure, on the one hand, the transmission of the steering movements and, on the other, to provide a sufficient deformation path for the dissipation of the impact energy.

The present invention is concerned with the task to avoid these disadvantages with a safety steering mechanism of the aforementioned type. The present invention essentially consists in that the impact pot is connected with the steering column by way of a unitary or a multi-partite elastic element. An adaptation of the impact pot to the direction of the load by the impinging body is achieved thereby since the elastic element enables an angular adaptation so that the impact surface becomes fully effective as a result thereof.

In order to eliminate additionally the steering wheel vibrations, it is particularly advantageous if the elastic element possesses a strong inherent damping by the selection of the material and/or its form. Therebeyond, it is advantageous if the elastic element has a progressive spring characteristic.

A structurally appropriate embodiment of the present invention which combines in itself all of the advantages, is obtained if the end of the steering column is provided with an annularly shaped flange, at which is secured the bottom of the impact pot by way of several sleeve-shaped rubber sockets or sleeves. These elastic rubber sockets or sleeves possess, on the one hand, a high inherent damping and, on the other, a progressive spring characteristic.

In order to facilitate with this type of securing the deformation of the impact pot in the direction of the steering column, it is advantageous if the bottom of the impact pot is provided with an undulatory fold within the area of its cylindrical surface. Additionally, it is appropriate if the length of the preferably two-step impact pot is larger than its diameter.

In order to obtain as large and as stable as possible an impact surface, the steering rim may possess at least within its lower area a larger form rigidity in the direction of the steering column than the impact pot.

By reason of the occurrence of different frequencies of excitation, it is appropriate in practice, if a damping means is arranged between the impact pot and the steering spindle. As a result thereof, excessive amplitudes are avoided also in case of excitation within the range of the natural frequency. A structurally very simple embodiment of a damping device is obtained if several band-steel elements distributed over the circumference of the steering spindle are rigidly secured at the steering spindle end, whose other ends elastically abut against the inner wall of the impact pot, preferably by interposition of friction bodies.

Accordingly, it is an object of the present invention to provide a safety steering mechanism for motor vehicles which avoids by simple means the aforementioned shortcomings and drawbacks encountered heretofore in the prior art.

Another object of the present invention resides in a safety steering mechanism for motor vehicles which permits an appropriate connection between the steering column and impact pot without compromise in the safety of the transmission of the steering movement and the presence of a sufficient deformation path for the dissipation of the impact energy.

A further object of the present invention resides in a safety steering arrangement for motor vehicles, especially for passenger motor vehicles which assures an adaptation of the impact pot to the effective direction of the load, thereby assuring the full impact surface under all conditions.

Another object of the present invention resides in a safety steering of the type described above which increases not only the safety but additionally also insures an extraordinary driving comfort by eliminating undesirable vibrations.

Figure 1A:
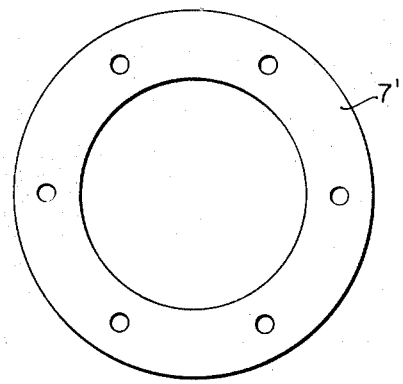

These and further objects, features and advantages of the present invention will become more obvious from the following description when taken in connection with the accompanying drawing, which shows, for purposes of illustration only, one embodiment in accordance with the present invention, and wherein:

FIG. 1 is a longitudinal cross-sectional view through one-half of a safety steering arrangement in accordance with the present invention, the other half being substantially axially symmetrical thereto; and FIG. 1A shows a one-piece elastic member that can be used in a modification of the embodiment shown in FIG. 1.

Referring now to FIG. 1 of the drawing, reference numeral 1 designates therein the impact pot which is connected at its upper end with the rim 14 of the steering wheel 13 by way of flanges 2 in any conventional manner and is elastically secured at its lower end with the upper end of the steering column 3. In this embodiment, the length of the impact pot 1 of two-step construction, is so selected that it is larger than the largest diameter thereof. Additionally, the impact pot 1 includes at its bottom 4 within the area of its outer generating surface an undulatory fold 5, whereas the bottom 4 is opened inwardly as a flange. The impact pot 1 is connected by means of this flange to the end of the steering column 3 provided with an annularly shaped flange 6.

The connection between impact pot 1 and the steering column end flange 6 takes place by way of several sleeve-like rubber sockets or bushings 7 distributed over the circumference of flange 6. The elastic sockets or bushings 7 are mounted over rivet bolts 8 welded to the flange 4 of the impact pot 1 and are retained by a riveted-on ring 9. Approximately at the height of the center thereof, the elastic bushings or sockets 7 are provided with grooves 10, by means of which they are form-lockingly connected in the axial direction with the ring-shaped flange 6. Since the rubber sockets or bushings 7 are inserted through the ring-shaped flange 6 of the steering column end, they also possess a form-locking connection to the steering column end in the circumferential direction. FIG. 1A shows a one-piece elastic ring 7' that can be used in place of the elastic bushings 7 shown in FIG. 1.

This connection between impact pot 1 and steering column 3 which is as such structurally simple, entails considerable advantages. It is achieved that the steering wheel is supported advantageously by a support of low frequency, and that additionally vibrations are absorbed since the rubber sockets or bushings 7 have a high inherent damping and progressive characteristic. Instead of such rubber sockets or bushings 7, it is, of course, also possible to utilize dowel pins, disks, conical elements, or the like.

Since steering wheels have to be actuated during the driving operation with differently large frequencies, the danger exists that the steering wheel receives an excessive amplitude if the frequency of excitation is disposed within the range of the natural frequency of the elastically secured steering wheel. In that case, the inherent damping of the elastic elements 7 is not sufficient so that an additional damping means has to be provided. In the illustrated embodiment, a friction damping means is provided, whereby several band-steel members 11 are rigidly connected at the circumference of the flange 6 of the steering column 3 which are elastically supported at the impact pot 1. Friction bodies 12 of any suitable material are disposed between the impact pot 1 and the band-steel elements 11, which effect a noise-free and service-free operation of the friction damping members. Instead of this structurally very simple friction damping means, other forms, especially hydraulic damping means may be provided without difficulties.

It is additionally achieved by the present invention that in case of an impact of the body of the driver at an angle, the impact surface formed by the steering wheel can still adapt itself prior to the deformation of the impact pot 1 to this angle so that, on the one hand, the deformation energy necessary for the reduction of injuries, can be produced in full whereas, on the other, a large impact surface remains preserved. It is particularly favorable in that respect if the steering wheel (not shown) is constructed more form rigid at least in its lower area than the impact pot 1.

It has been demonstrated in actual tests that the natural frequency of the steering wheel rim can be kept the lower, the smaller one keeps the hardness. Also, the lesser hardness of the steering wheel rim simultaneously leads to increased angle adaptation possibilities to further assure optimum contact with the body of the driver upon impact.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety steering arrangement for motor vehicles comprising: a steering column, an impact pot means positioned between the steering column and a steering wheel, and elastic connecting means positioned between the impact pot means and the steering column for elastically transferring forces between said impact pot means and said steering column.

2. A safety steering according to claim 1, characterized in that the elastic connecting means is a unitary element.

3. A safety steering according to claim 1, characterized in that the elastic connecting means is a multi-partite elastic element.

4. A safety steering according to claim 1, characterized in that the elastic connecting means includes damping means for providing strong inherent damping of forces transmitted between the steering column and impact pot means.

5. A safety steering according to claim 4, characterized in that the strong inherent damping means includes the material of the elastic connecting means.

6. A safety steering according to claim 5, characterized in that the damping means further includes the shape of the elastic connecting means.

7. A safety steering according to claim 4, characterized in that the damping means includes the shape of the elastic connecting means.

8. A safety steering according to claim 4, characterized in that the elastic connecting means has a progressive spring characteristic.

9. A safety steering arrangement for motor vehicles comprising: a steering column, an impact pot means provided between the steering column and a steering wheel, and elastic connecting means for connecting the steering column to the impact pot means, characterized in that the end of the steering column includes an annularly shaped flange which is secured at the bottom of the impact pot means by way of several sleeve-like elastic socket means.

10. A safety steering according to claim 9, characterized in that the bottom of the impact pot means is provided within the area of its outer surface with an undulatory fold means.

11. A safety steering according to claim 10, characterized in that the length of the impact pot means is larger than its diameter.

12. A safety steering according to claim 11, characterized in that the impact pot means is of two-step construction.

13. A safety steering according to claim 11, characterized in that the steering wheel rim has a greater form rigidity in the direction of the steering column at least within its lower area than the impact pot means.

14. A safety steering according to claim 13, characterized in that a damping means is arranged between the impact pot means and the end of the steering column.

15. A safety steering according to claim 14, characterized in that the damping means includes several band-steel elements rigidly connected at the steering column end, the other ends of the band-steel elements elastically abutting against the inner wall of the impact pot means.

16. A safety steering according to claim 15, characterized in that the band-steel elements are distributed over the circumference of the steering column end.

17. A safety steering according to claim 15, characterized in that the band-steel elements elastically abut against the inner wall of the impact pot means by interposition of friction body means.

18. A safety steering according to claim 1, characterized in that the elastic connecting means has a progressive spring characteristic.

19. A safety steering according to claim 1, characterized in that the bottom of the impact pot means is provided within the area of its outer surface with an undulatory fold means.

20. A safety steering according to claim 1, characterized in that the length of the impact pot means is larger than its diameter.

21. A safety steering according to claim 20, characterized in that the impact pot means is of two-step construction.

22. A safety steering according to claim 1, characterized in that the steering wheel rim has a greater form rigidity in the direction of the steering column at least within its lower area than the impact pot means.

23. A safety steering according to claim 1, characterized in that a damping means is arranged between the impact pot means and the end of the steering column.

24. A safety steering according to claim 23, characterized in that the damping means includes several band-steel elements rigidly connected at the steering column end, the other ends of the band-steel elements elastically abutting against the inner wall of the impact pot means.

25. A safety steering according to claim 24, characterized in that the band steel elements are distributed over the circumference of the steering column end.

26. A safety steering according to claim 25, characterized in that the band steel elements elastically abut against the inner wall of the impact pot means by inerposition of friction body means.

27. A safety steering arrangement for motor vehicles comprising: a steering column, a steering wheel, an impact pot means positioned between the steering column and the steering wheel, and elastic connecting means for connecting said impact pot means to at least one of said steering column and said steering wheel such that all forces transmitted between the steering column and said steering wheel pass through said elastic connecting means.

* * * * *